United States Patent [19]

Swindall

[11] Patent Number: 5,342,076
[45] Date of Patent: * Aug. 30, 1994

[54] GOOSENECK TRAILER HITCH

[76] Inventor: Jackie J. Swindall, 9441 W. University, Odessa, Tex. 79764

[*] Notice: The portion of the term of this patent subsequent to Feb. 22, 2011 has been disclaimed.

[21] Appl. No.: 101,858

[22] Filed: Aug. 4, 1993

Related U.S. Application Data

[63] Continuation-in-part of Ser. No. 13,081, Feb. 3, 1993, Pat. No. 5,288,095.

[51] Int. Cl.5 .............................................. B60D 1/00
[52] U.S. Cl. ............................... 280/479.2; 280/479.3; 280/504
[58] Field of Search .................. 280/417.1, 477, 478.1, 280/479.2, 479.3, 491.1, 491.2, 491.3, 504, 506, 432

[56] References Cited

U.S. PATENT DOCUMENTS

| | | | |
|---|---|---|---|
| 3,126,210 | 3/1964 | Hill | 280/479.2 |
| 3,622,182 | 11/1971 | Grosse-Rhode | 280/479.2 |
| 3,860,267 | 1/1975 | Lyons | 280/479.3 |
| 4,921,266 | 5/1990 | Beals | 280/417.1 X |
| 4,951,957 | 8/1990 | Gullickson | 280/479.3 X |

Primary Examiner—Mitchell J. Hill
Assistant Examiner—Victor E. Johnson
Attorney, Agent, or Firm—Milburn & Peterson

[57] ABSTRACT

This invention relates to trailer hitches generally and more specifically to a hitch that may be swiveled and extended as necessary to couple a trailer thereto and readily align and lock the hitch in transportation mode. The hitch has a base plate with a partial semicircular perimeter having a trunnion formed at its center of radius, a tubular housing secured at the trunnion atop the base plate to permit arcuate movement relative to the base plate, and tubular housing having a safety member thereunder which protrudes beneath the semicircular perimeter to limit relative vertical movement between the tubular housing and the base plate, a slide bar captured within said tubular housing with a towing ball projecting beyond said housing for limited linear movement therein, and a spring biased locking pin for releasable securing the trailer hitch with the slide bar retracted and the tubular housing centered along the perimeter.

8 Claims, 6 Drawing Sheets

GOOSENECK TRAILER HITCH

This is a continuation-in-part of copending application Ser. No. 08/013,081 filed Feb. 3, 1993, now U.S. Pat. No. 5,288,095, Feb. 22, 1994.

BACKGROUND OF THE INVENTION

1. Field of the Invention

This invention relates to improvements in the attachment of towed vehicles to towing vehicles, and more particularly, to an improved trailer hitch which allows misalignment of a towing vehicle with respect to a vehicle to be towed as the vehicles are being coupled together.

Trailer hitches typically have a hitch ball mounted on a hitch bar rigidly secured to a towing vehicle. This ball is adapted to be coupled to the socket on the tongue of a vehicle or trailer to be towed. Generally, with trailer hitch assemblies of this type, the towing vehicle must be moved in reverse with the ball properly aligned with the trailer socket to make the necessary connection.

2. Description of the Prior Art

Attempts have been made to solve a misalignment problem when the socket of a vehicle to be towed is not properly aligned with the ball of the towing vehicle when the latter is moving in reverse. U.S. Pat. Nos. 3,860,267 and 4,350,362 disclose trailer hitches having singable bars which pivot in a horizontal plane to accommodate such misalignment between a towing vehicle and a trailer. However, both patents show a one-piece bar movable out of a bar-like housing, but such construction does not allow the user to pivot the bar until the bar is completely out of the housing. This is the main drawback of the trailer hitch of U.S. Pat. No. 3,860,267

U.S. Pat. No. 4,350,362 shows a slightly different trailer hitch in that it does not have a long, slender housing for supporting the main hitch bar. The hitch bar of U.S. Pat. No. 4,350,362 has the same drawback as U.S. Pat. No. 3,860,267 in that it has a hitch bar which cannot pivot about a vertical axis until the full length of the hitch bar is pulled outwardly from its retracted position.

U.S. Pat. No. 4,951,957 shows a typical wide-range hitch assembly which mounts on the towing vehicle generally underneath and protrudes as little as possible beyond the bumper of the vehicle. The advantage of placing the hitch under the vehicle to avoid protrusion of the ball far beyond the rear bumper is offset by the reduced lateral maneuverability or movement of the ball and extendibility beyond the bumper to accommodate a wide-range misalignment between the towing vehicle and the trailer.

SUMMARY OF THE INVENTION

The present invention is directed to a trailer hitch or swivel hitch of improved construction which is simple and rugged and which provides greater flexibility in maneuvering a towing vehicle into a position to be hitched to a trailer.

The present invention is readily attached to the existing pick-up bumpers which are accommodated for mounting trailer balls directly to the bumper and generally provide at least three holes for various size trailer balls. Applicant utilizes this bumper configuration to secure the base plate and housing which retains a telescoping draw or slide bar, of his swivel hitch to the vehicle. The housing and base plate are secured by a shoulder bolt which acts as a trunnion for the lateral movement of the housing. The base plate is additionally secured in the other remaining holes of the bumper to provide substantial support for the hitch assembly. The hitch includes a safety bar which limits vertical movement between the base plate and housing. A releasable locking pin holds the housing and slide bar in a locked or transporting position and is readily released by a pull-ring to withdraw and allow the slide bar and the housing to move relatively to the locking pin. Once the trailer has been hitched to the hitch bar, then the vehicle is pulled forward and the housing and slide bar move into alignment such that the locking pin protrudes through a bore in the bottom of the housing and when the vehicle is slowed or stopped, the draw or slide bar closes in the housing until the bore therethrough encounters the locking pin which immediately seats into the slide bar, thus locking the trailer hitch in towing position.

The swivel hitch of the present invention provides all the features desirable in a trailer hitch and can be readily mounted without the necessity of welding or any other method of attaching a trailer hitch to a bumper or the under-frame of the towing vehicle by merely bolting means.

Thus, the present invention provides an improved swing hitch for trailers which is versatile and comprises relatively few parts and readily attaches to the bumpers of most presently manufactured pick-up trucks and the like.

The object of the present invention is to provide an improved trailer hitch which has a high degree of lateral movement about a trunnion which is centered on the bumper of the towing vehicle and has an extendable and retractable draw bar for mounting the trailer ball to accommodate securing a trailer to the hitch.

Another object of this invention is to provide a simple trailer hitch which by releasing a locking pin can be laterally and longitudinally maneuvered to accommodate ease of attachment of a trailer to the hitch and automatically realigns and locks in a traveling position.

In a different embodiment an objective of this invention is to provide an improved gooseneck trailer hitch which has a high degree of lateral movement about a trunnion and has an extendable and retractable draw bar with a gooseneck trailer coupler, which is mounted in the bed and secured to the frame of the towing vehicle.

In such different embodiment the object of this invention is to provide a simple gooseneck trailer hitch which by releasing a locking pin can be laterally and longitudinally maneuvered to accommodate ease of attachment of a trailer to the hitch and automatically realigns and locks in a traveling position.

Other objects of this invention will become apparent from the following description, as described in conjunction with the accompanying drawings.

IN THE DRAWINGS

FIG. 1 is an exploded perspective view of the swivel hitch of the present invention secured to a vehicle bumper; and FIG. 2 is a partial cross-sectional view of the assembled hitch illustrating the extendibility of the slide bar in phantom; and FIG. 3 illustrates the hitch mounted to a pick-up truck bumper with three trailer hitch mounting bores which are utilized to secure Applicant's hitch and illustrates in phantom the lateral and longitudinal movement of the hitch relative to the central trunnion;

DETAILED DESCRIPTION OF THE PREFERRED EMBODIMENT

Figure 1:
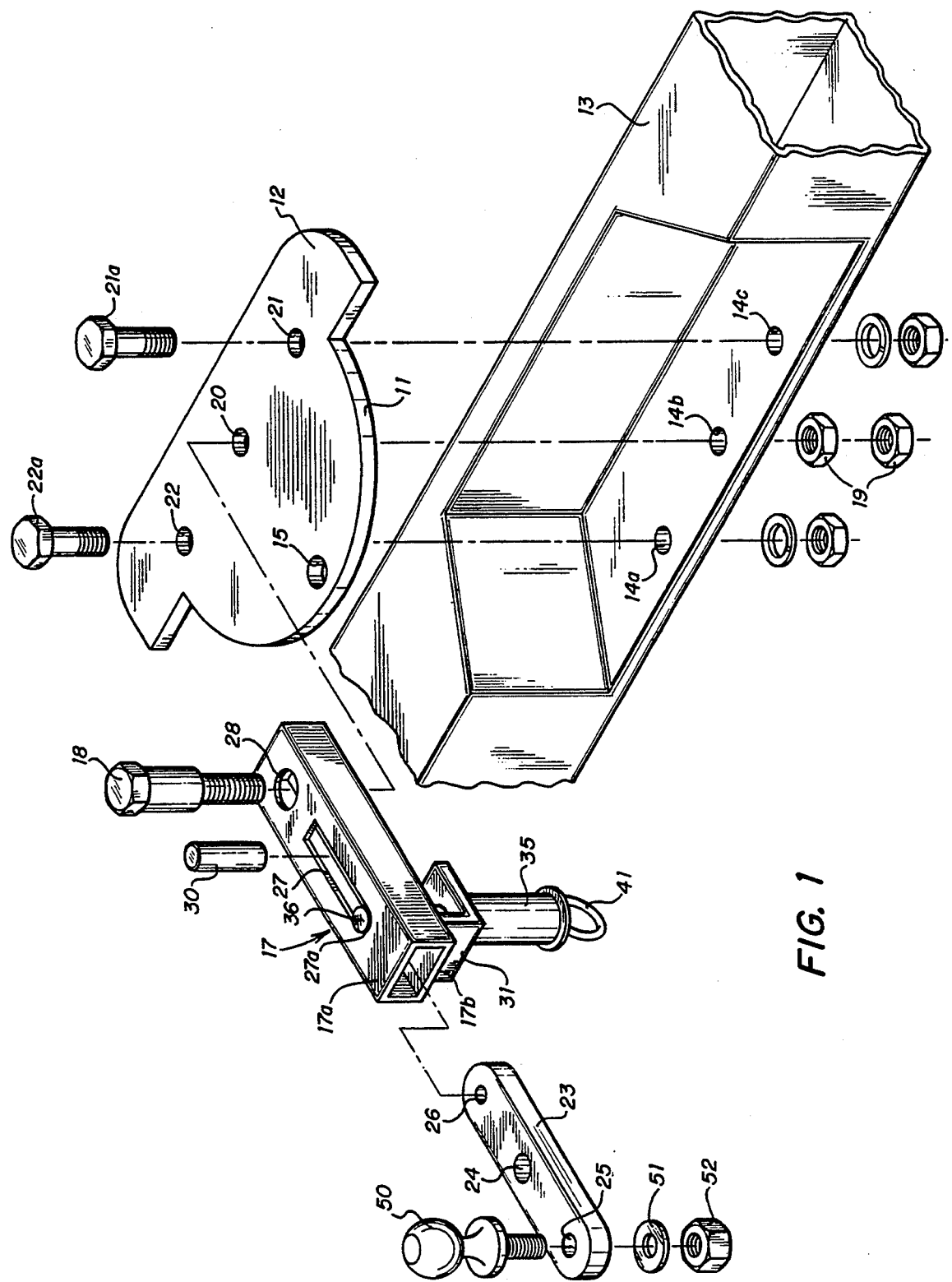
Figure 2:
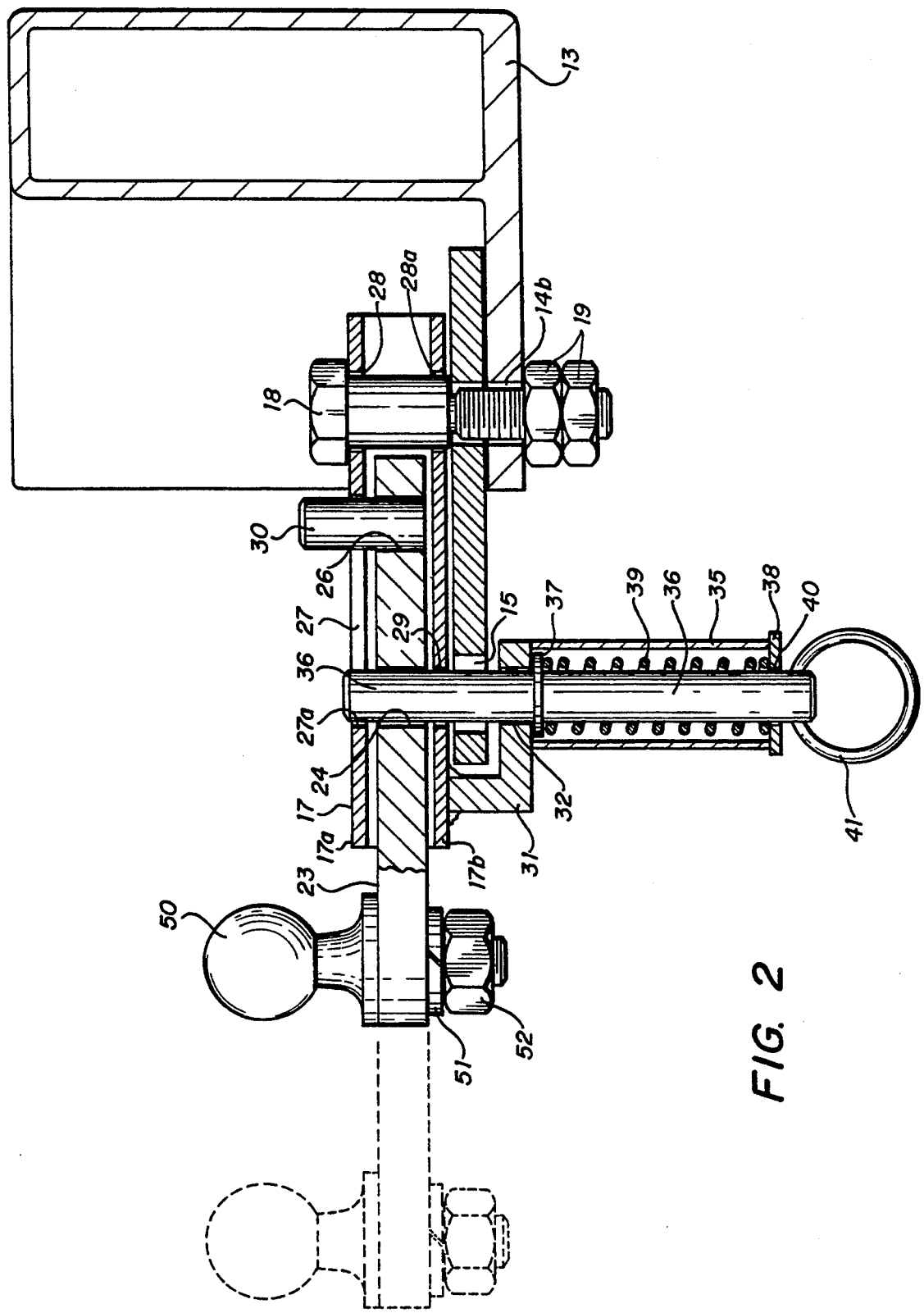
Figure 3:
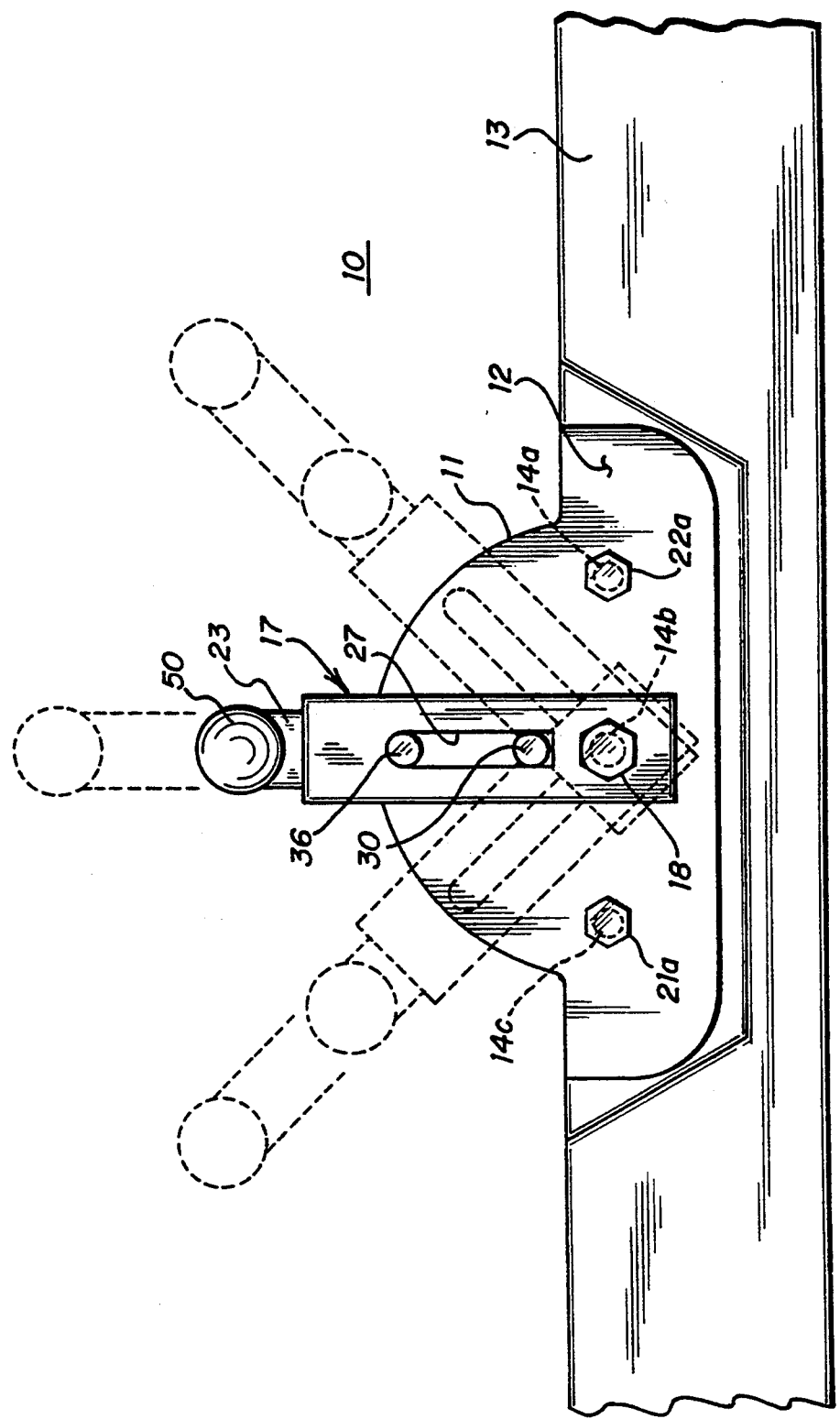

Referring to FIGS. 1, 2 and 3 of the drawings, the swivel hitch of the present invention is generally referred to as 10 and includes a base plate 12 which has a central bore 20 and a pair of bores 21 and 22 on each side of central bore 20 and a circular perimeter 11. Base plate 12 also has a bore 15 which is on a radius bisecting the semicircular perimeter 11. The base plate 12 is secured to a truck bumper 13 in the three factory-produced bumper bores 14a, 14b and 14c for mounting one or more trailer balls therein. Of course a bumper that does not have such bores could be so modified. A bore hole 29 is provided in bottom wall 17b of housing 17. Housing 17 has a longitudinal slot 27 and coaxially aligned bores 28 and 28a through the top wall 17a and bottom wall 17b of the housing 17. Slot 27 has a semicircular end 27a which is coaxially aligned with bore hole 29 in bottom wall 17b.

The base plate 12 and housing 17 are secured to the bumper 13 by shoulder bolt 18 passing through bores 28 and 28a in housing 17, central bore 20 in base plate 12, and bumper bore 14b and secured by lock nuts 19 which forms a trunnion to allow rotation of the housing 17 relative to the base plate 12. The base plate 12 is further secured to bumper 13 by two additional bolts 21a and 22a through bores 21 and 22 of base plate 12 and bumper bores 14a and 14c.

A draw or slide bar 23 has at opposite ends bores 25 and 26 with an aperture 24 intermediate of said bores 25 and 26. The slide bar 23 is positioned within housing 17 and retained therein by guide pin 30 secured in bore 26 of slide bar 23 and extending upward in slot 27 of housing 17. Welded to the bottom of the forward portion of the housing 17 is a safety bar 31 having an "L" therein. A circular housing 35 is secured to the safety bar 31 at the bottom about the bore hole 32. A rounded end or nose locking pin or locating pin 36 has a spring plate 37 secured to the locking pin 36 such that when the circular spring plate 37 is fully seated against safety bar 31 the rounded end of pin 36 will extend through the bore hole 32 of the safety bar 31, bore 15 in base plate 12, bore 29 in the bottom wall 17b of housing 17, aperture 24 in slide bar 23 and through semicircular end 27a of slot 27 in the top wall 17a of housing 17 thereby locking swivel hitch 10 in towing position. A spring 39 is captured between spring plate 37 and the bottom plate 38 which has a bore 40 slightly in excess of the diameter of pin 36. The spring 39 biases locking pin 36 in the aforesaid aperture, bores and semicircular end. When fully positioned in the aperture, bores, and semicircular slot, locking pin 36 extends below the bore 40 in bottom plate 38 of the circular housing 35. The locking pin 36 has a ring 41 secured therethrough below bore 40 adapted for pulling the locking pin 36 against the bias of spring 39 sufficient to move the pin out of the semicircular end 27a of slot 27 and out of the aperture 24 in the slide bar 23, and the bores in housing 17, base plate 12 and the safety bar 31. With locking pin 36 withdrawn, housing 17 may then be moved laterally about base plate 12 with the safety bar 31 and circular housing 35 traveling along the semi-circular perimeter 11 of the base plate 12 such that throughout its path upward thrust on the housing would be stopped by the engagement of safety bar 31 with the bottom of base plate 12 and downward thrust on the housing 17 would be stopped by the engagement with base plate 12. Thus, there is a nominal amount of tolerance between the base plate 12 and safety bar 31 to permit limited relative vertical movement, but not sufficient movement to damage the housing 17 and cause it to become inoperable. A trailer ball 50 is secured in the bore 25 of slide bar 23 with a washer 51 and a nut 52. Likewise, with locking pin 36 withdrawn, slide bar 23 with trailer ball 50 may be extended from or retracted into housing 17.

The longitudinal travel of slide bar 23 may be increased by moving the "L" shaped safety bar 31 further out on housing 17 and extending coaxially aligned semicircular end 27a of slot 27 further out on housing 17. Also, housing 17 and base plate 12 could be extended with the radius of semicircular perimeter 11 being increased and the radius of the arcuate path of housing 17 described by locking pin 36 being increased.

In a different configuration the bore 20 in base plate 12 could be moved forward so that the housing 24 could be easily rotated approximately 90° in either direction from its forward position.

In operation of the swivel hitch 10, the towing vehicle with the swivel hitch 10 mounted thereon would be backed toward the trailer to be towed until the ball 50 of swivel hitch 10 was within maneuverable range of the mating coupler of the trailer. The ball 50 would then be maneuvered laterally and longitudinally until the hookup was completed. The pulling vehicle would then be driven forward to align the housing 17 and the slide bar 23 longitudinally and then slowed or stopped causing the slide bar to retract into housing 17 with apertures 24 and bores 29, 15 and 32 becoming aligned such that spring 39 will automatically bias latch pin 36 into and through each such aperture and bores and through semicircular end 27a of slot 27 in the top wall of housing 17.

Figure 4:
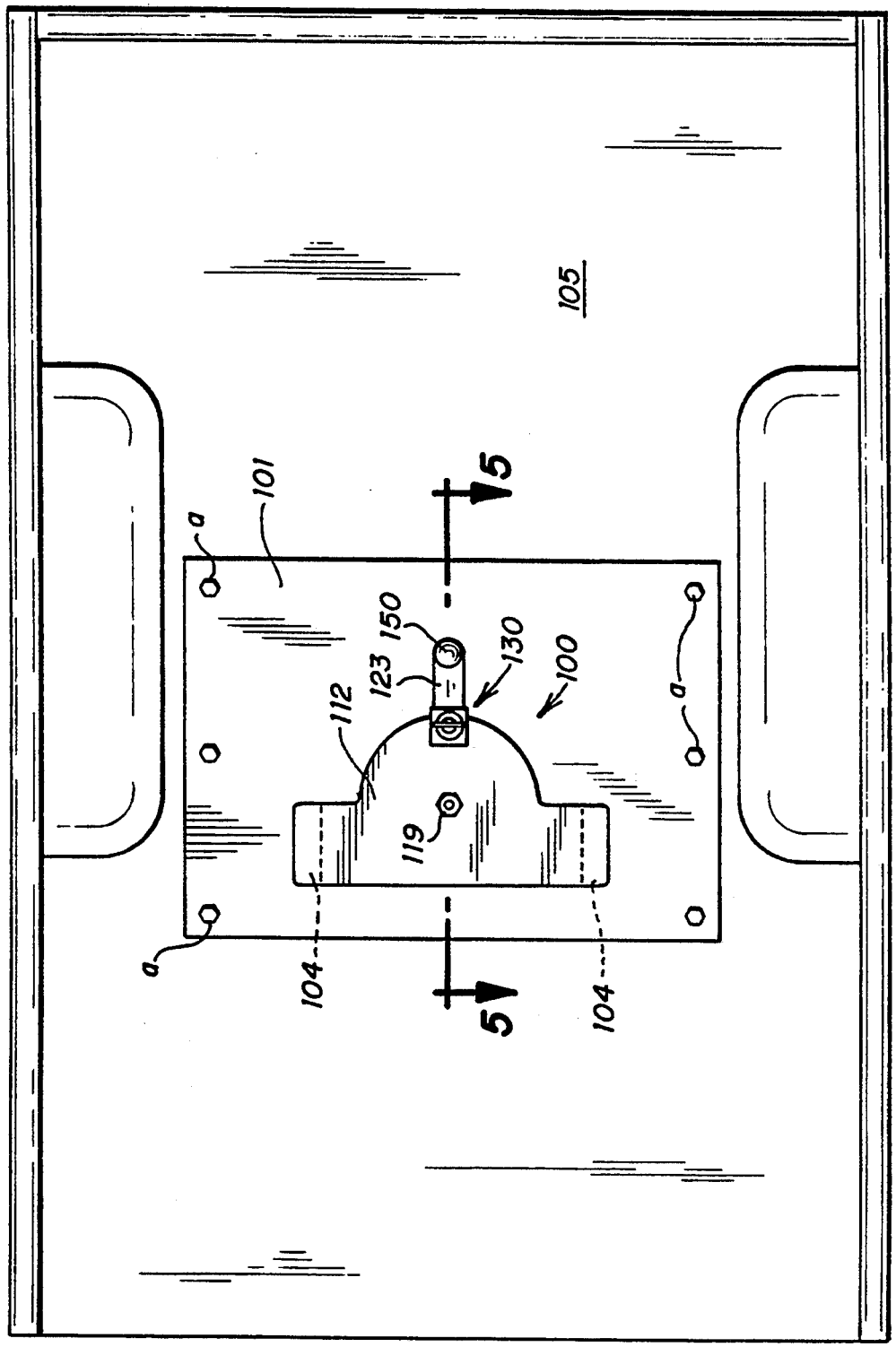
FIG. 4 is a top view of the bed of a vehicle illustrating the mounting arrangement for the gooseneck hitch.
Figure 5:
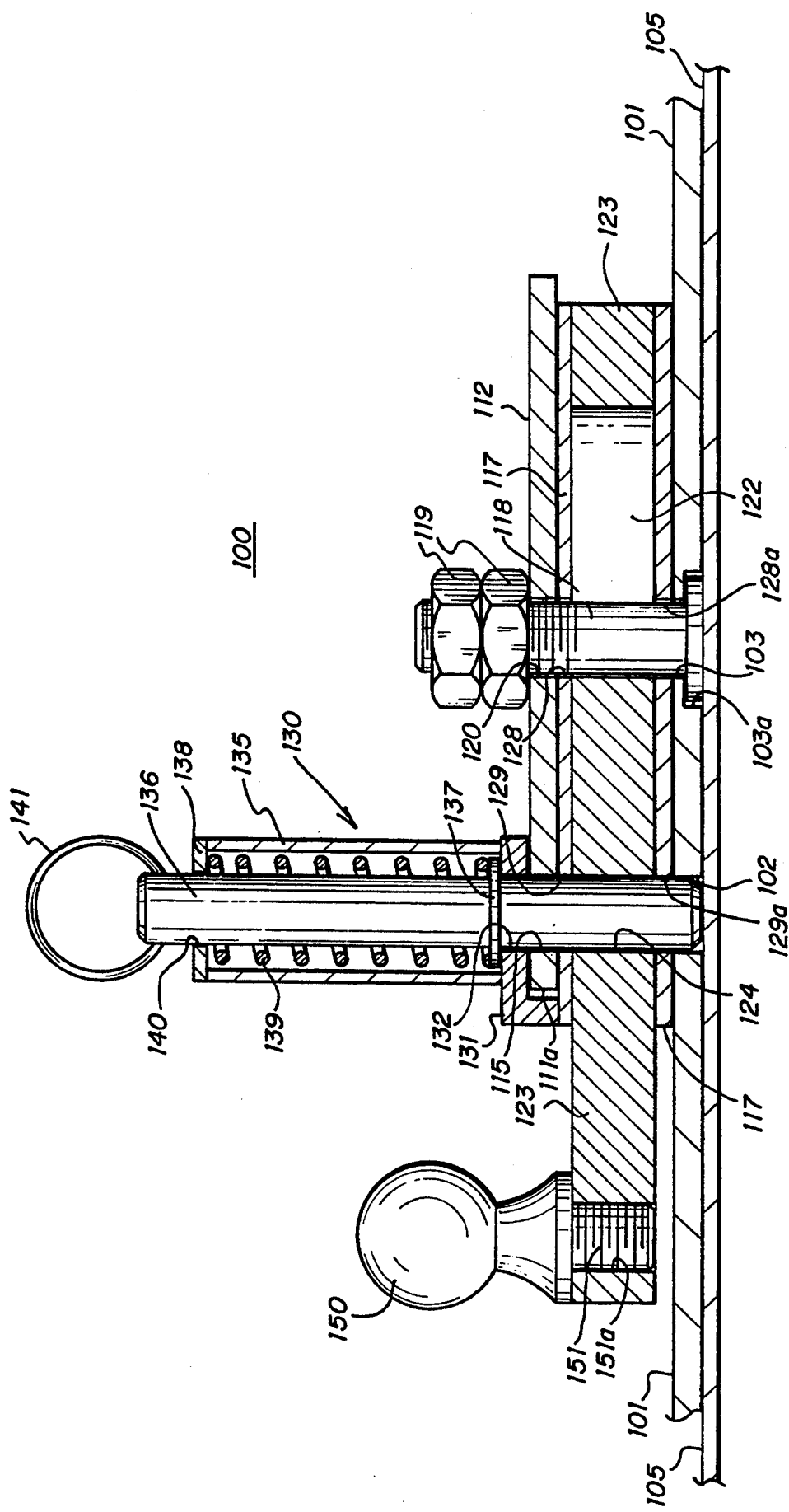
FIG. 5 is a sectional view taken along line 5—5 of FIG. 4 illustrating a cross-sectional view of the gooseneck hitch.
Figure 6:
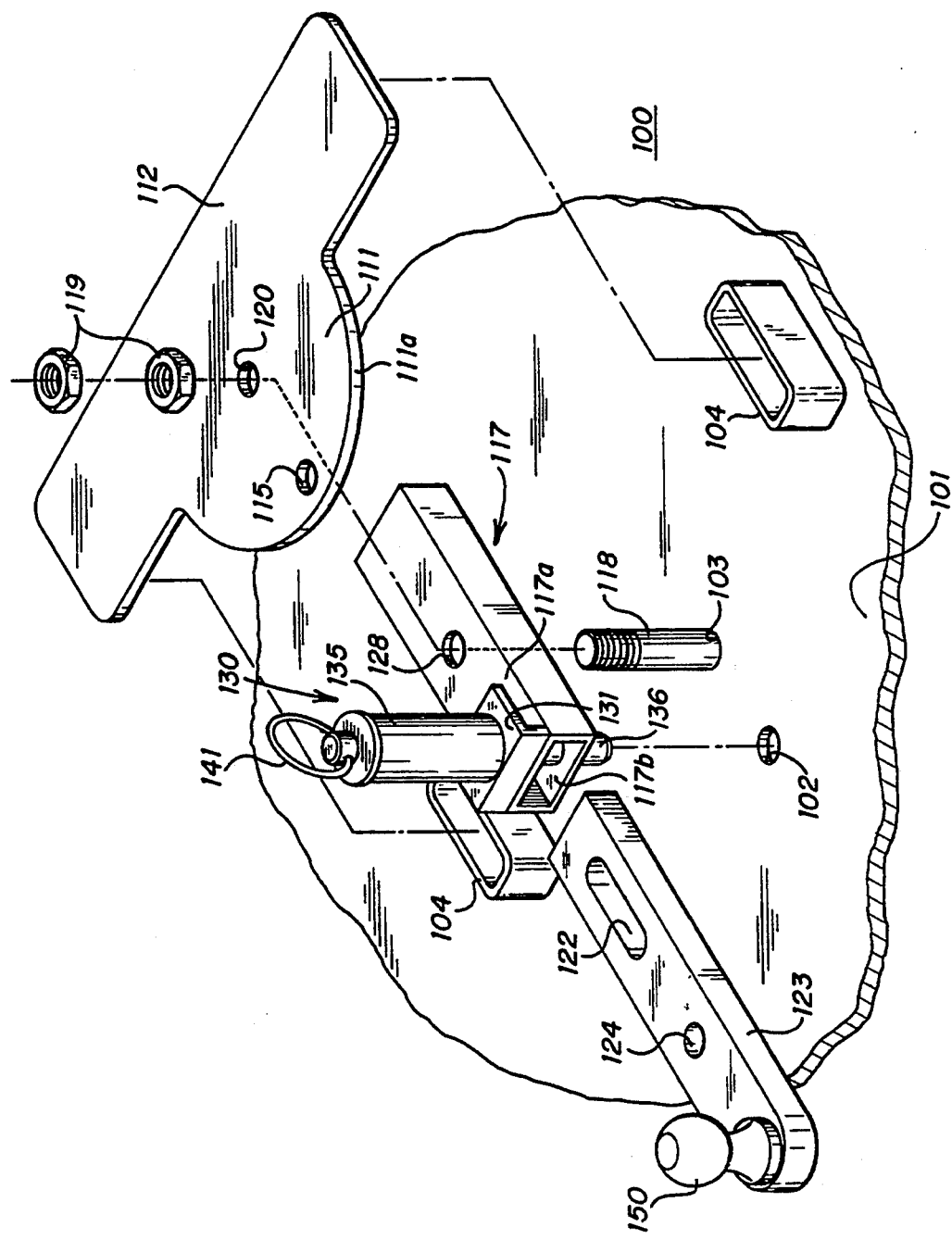
FIG. 6 is an exploded view of the gooseneck hitch with the mounting plate broken away.

In FIG. 4, 5 and 6 a different embodiment of the gooseneck hitch is disclosed and parts that are similar to FIG. 1, 2 and 3 are given the corresponding number beginning with one hundred.

The gooseneck trailer hitch 100 is mounted in the bed of a pickup or other suitable towing vehicle 105. The gooseneck trailer hitch 100 has an anchor plate 101 secured in any suitable manner in the bed of vehicle 105, such as by bolts "a" through anchor plate 101 and secured to the frame (not shown) of the vehicle 105. A pair of spacers 104 secures guide plate 112 to anchor plate 101. Anchor plate 101 has an aperture 102 and a mounting bore 103 which includes a counterbore 103a. Guide plate 112 has a semicircular section 111 and a mounting hole 120. The mounting hole 120 is the center of radius for the semicircular periphery 111a of semicircular section 111. Aperture 115 in guide plate 112 is on the radius bisecting the semicircular periphery 111a.

Housing 117 has a top wall 117a and a bottom wall 117b. Top wall 117a has a mounting bore 128 and an aperture 129. Bottom wall 117b has a mounting bore 128a and an aperture 129a. Mounting bores 128 and 128a are coaxially aligned and apertures 129 and 129a are coaxially aligned.

A draw bar 123 has a guide slot 122 at one end and a vehicle coupler or ball 150 at the other end. As illustrated ball 150 has threads 151 and is secured in threaded bore 151a of draw bar 123. The ball 150 maybe welded into threaded bore 151a or it may be attached in any suitable manner. The draw bar 123 has an aperture 124 intermediate guide slot 122 and ball 150.

The tubular housing 117 is attached to anchor plate 101 and guide plate 112 by a trunnion 118 extending through counterbore 103a and bore 103 in anchor plate 101, through mounting bore 128a, through slot 122 of draw bar 123, through mounting bore 128 and through mounting hole 120 in guide plate 112. Trunnion 118 is secured in position by locknuts 119.

A locking mechanism 130 similar to locking mechanism seen in FIGS. 1 and 2 is mounted to safety member or bar 131. The safety bar 131 has an L-shape and is attached atop the housing 117 and has a bore 132 therein. The locking mechanism 130 includes circular housing 135, rounded end or nose locking pin or locating pin 136, a spring plate 137 secured to locking pin 136. A spring 139 is captured in circular housing 135 between spring plate 137 and top plate 138 which has a bore 140 slightly in excess of the diameter of locking pin 136. Locking pin 136 has a ring 141 secured therethrough.

In the locked or towing position the circular spring plate 137 is fully seated against the safety bar 131, and locking pin 136 extends through bore 132 of safety bar 131, aperture 115 in guide plate 112, aperture 129 in top wall 117a of housing 117, aperture 124 in slide bar 123, aperture 129a in bottom wall 117b and into aperture 102 in anchor plate 101 thereby locking the gooseneck hitch in the towing position. It should be noted that locking pin 136 need only extend through bore 132 of safety bar 131, aperture 115 of guide plate 112 and apertures 129 and 129a of housing 117 in order to lock gooseneck hitch 100 in the trailer towing position.

With locking pin 136 withdrawn housing 117 may then be moved arcuately about the semicircular periphery 111a of guide plate 112 with safety member 131 extending above the semicircular section 111, thus limiting any relative vertical movement between housing 117 and guide plate 112. The locking pin 136 rides on the top of guide plate 112 once withdrawn from aperture 115.

Anchor plate 101 is provided to prevent the telescoping draw bar assembly from coming in contact with the bed of the towing vehicle, which could cause damage. Anchor plate 101 is not essential to the gooseneck trailer hitch, for example guide plate 112 may be spaced above and secured through the bed of the towing vehicle into the frame thereof by any suitable means. The guide plate 112 could have a footing or mounting arrangement comprising an L-shaped or channeled bracket welded to the guide plate 112 and bolted through the bed 105 and into the frame of the towing vehicle. In such an arrangement under a sufficiently heavy load safety bar 131 would engage guide plate 112 along the semicircular section 111 and take part of the load. In applications where anchor plate 101 is not used, it would be apparent with sufficient clearance between guide plate 112 and the bed of the towing vehicle that the telescoping draw bar could be attached above guide plate 112 similar to the arrangement illustrated in FIG. 1.

In operation a towing vehicle with the gooseneck trailer hitch 100 mounted thereon would be backed toward the trailer to be towed until the ball 150 of gooseneck trailer hitch 100 was within maneuverable range of the mating coupler of the trailer. The locking pin 136 would be withdrawn from the guide plate 112, housing 117 and draw bar 123, and ball 150 would then be maneuvered laterally and longitudinally until the hook-up was completed. During this hook-up, locking pin 136 rest on the top surface of semicircular section 111 of guide plate 112. The pulling vehicle would then be driven forward to align the housing 117 and the slide bar 123 longitudinally. This alignment causes pin 136 to extend through aperture 115 of guide plate 112 and rest on the top wall 117a of housing 117. The vehicle is then slowed or stopped causing the slide bar to retract into housing 117 with apertures 124 becoming aligned with apertures 129 and 115 and bore 132 such that spring 139 will automatically bias locking pin 136 into and through apertures in the housing 117, the draw bar 123, and anchor plate 101.

It will be appreciated that various modifications and changes will be suggested from the description and disclosure of the preferred embodiment, and such changes and modifications are within the spirit and scope of the present invention which is limited only by the accompanying claims:

What is claimed is:

1. An improved gooseneck trailer hitch which swivels and extends and retracts for coupling a pulling vehicle having a frame and a bed with a gooseneck trailer to be towed comprising:

a tubular housing having a top wall, a spaced apart bottom wall, and a pair of spaced apart and opposing side walls, the tubular housing having a first bore at one end located in the top wall and a second bore located in the bottom wall, said first bore and said second bore being coaxially aligned respective to each other, a first aperture in said top wall intermediate said first bore and the other end of said top wall, and a second aperture in said bottom wall intermediate said second bore and the other end of said bottom wall, said first aperture and said second aperture being coaxially aligned with respect to each other, an anchor plate for securing the gooseneck trailer hitch in the bed of a vehicle, said anchor plate having an aperture and mounting bore longitudinally aligned therein, a guide plate having a partial semicircular periphery and a mounting hole corresponding to the mounting bore in said anchor plate, the guide plate having an aperture near the periphery thereof, the tubular housing attached to the anchor plate and the guide plate by a trunnion for relative rotation of said tubular housing along the partial semicircular periphery of the guide plate, a safety member secured to the top wall of said tubular housing and extending above said semicircular periphery of the guide plate, said safety member having an aperture therein in alignment with said aperture in the top wall of said tubular housing, a slide bar having a guide slot at one end and a vehicle coupler at the other end, having an aperture therein intermediate said guide slot and said vehicle coupler, said slide bar retained partly within said tubular housing by the trunnion extending through said guide slot thereby facilitating relative movement between said slide bar and said tubular housing, and a retractable pin biased in engagement with and through the apertures in said safety member, the guide plate and said slide bar for releasably locking said trailer hitch in a trailer towing position.

2. An improved gooseneck trailer hitch which swivels and extends and retracts for coupling a pulling vehicle having a frame and a bed with a gooseneck trailer to be towed comprising:

a guide plate having a portion which has a semicircular periphery, and having a central mounting hole therein, said central mounting hole defining the center of radius for the semicircular periphery of said guide plate, the guide plate having an aperture distal from said central mounting hole on the radius bisecting said semicircular periphery, a tubular housing having an upper wall and a lower wall, and having a mounting bore therethrough at one end, and an aperture therethrough spaced from said mounting bore, a safety member attached above the tubular housing with a bore therethrough aligned with said aperture in the tubular housing, a draw bar having a guide slot at one end and a vehicle coupler at the other end, said draw bar including an aperture intermediate said guide slot and said vehicle coupler, an anchor plate for securing the gooseneck trailer hitch in the bed of a vehicle, said anchor plate having an aperture and mounting bore longitudinally aligned therein, the tubular housing and said draw bar attached to the anchor plate and the guide plate by a trunnion extending through the mounting bore in the anchor plate, through said mounting bore in the tubular housing, through said guide slot in said draw bar and through said mounting hole in the guide plate, a locking member having a locking pin biased in engagement with and through the bore in the safety member, the aperture in the guide plate, the aperture in the tubular housing and the aperture in the draw bar, which upon retraction of the locking pin, the tubular housing is free for arcuate movement about the semicircular periphery and the draw bar is free for extension from and retraction into said tubular housing.

3. A gooseneck trailer hitch for mounting upon a pulling vehicle with a frame and a bed comprising:

a guide plate having a semicircular section spaced above the bed of a towing vehicle secured to the frame thereof, a mounting hole in said guide plate being the center of radius for the semicircular periphery of said semicircular section, and having an aperture intermediate the mounting hole and the semicircular periphery on the radius bisecting said semicircular periphery, a tubular housing having an upper wall and a lower wall, and having a mounting bore therethrough at one end and an aperture therethrough at the other end, a telescoping draw bar having a guide slot therein at one end, having a vehicle coupler at the other end and having an aperture therein intermediate said guide slot and said vehicle coupler for alignment with said aperture in said tubular housing, said draw bar positioned within said tubular housing with the guide slot aligned with the mounting bore in the tubular housing, said tubular housing and said drawbar attached to said guide plate by a trunnion extending through said mounting bore in said tubular housing, through said guide slot in said drawbar and into the mounting hole in said guide plate, a releasable locking pin assembly for latching said tubular housing and said draw bar aligned along the radius bisecting the semicircular periphery of said semicircular section.

4. The gooseneck trailer hitch of claim 3 wherein said releasable locking pin assembly includes a safety member attached above said tubular housing with a bore therethrough aligned with said aperture in the tubular housing, said safety member limiting relative vertical movement between said tubular housing and said guide plate.

5. A gooseneck trailer hitch for mounting upon a towing vehicle with a frame a bed comprising:

a guide plate having a semicircular section and a mounting bracket for spacing said guide plate above the bed of the towing vehicle and secured into the frame thereof, a mounting hole in said guide plate being the center of radius for the semicircular periphery of said semicircular section, and having an aperture intermediate the mounting hole and the semicircular periphery on the radius bisecting said semicircular periphery, a tubular housing having an upper wall and a lower wall, and having a mounting bore therethrough at one end and an aperture therethrough at the other end, a telescoping draw bar having a guide slot therein at one end, having a vehicle coupler at the other end and having an aperture therein intermediate said guide slot and said vehicle coupler for alignment with said aperture in said tubular housing, said draw bar positioned within said tubular housing with the guide slot aligned with the mounting bore in the tubular housing, said tubular housing and said drawbar attached to the guide plate by a trunnion extending through said mounting bore in said tubular housing, through said guide slot in said drawbar and through the mounting hole in said guide plate, a releasable locking pin assembly for latching said tubular housing and said draw bar aligned along the radius bisecting the semicircular periphery of said semicircular section.

6. The gooseneck trailer hitch of claim 5 wherein said releasable locking pin assembly includes a safety member attached to said tubular housing with a bore therethrough aligned with said aperture in the tubular housing, said safety member limiting relative vertical movement between said tubular housing and said guide plate.

7. The gooseneck trailer hitch of claim 5 wherein the mounting bracket comprises an anchor plate positioned in the bed of and secured to the frame of the towing vehicle and a pair of spacers supporting said guide plate spaced above said anchor plate.

8. The gooseneck trailer hitch of claim 7 wherein said releasable locking pin assembly includes a safety member attached above said tubular housing with a bore therethrough aligned with said aperture in the tubular housing, said safety member limiting relative vertical movement between said tubular housing and said guide plate.

* * * * *